United States Patent
Mizuno et al.

(10) Patent No.: US 8,199,217 B2
(45) Date of Patent: Jun. 12, 2012

(54) DEVICE AND METHOD FOR IMAGE PROCESSING, PROGRAM, AND IMAGING APPARATUS

(75) Inventors: Hiroyuki Mizuno, Tokyo (JP); Satoshi Terada, Fukuoka (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 12/461,406

(22) Filed: Aug. 11, 2009

(65) Prior Publication Data

US 2010/0053366 A1  Mar. 4, 2010

(30) Foreign Application Priority Data

Sep. 1, 2008 (JP) ................................. 2008-223865

(51) Int. Cl.
- H04N 9/73 (2006.01)
- H04N 9/64 (2006.01)
- H04N 5/222 (2006.01)
- G06K 9/00 (2006.01)

(52) U.S. Cl. ................ 348/224.1; 348/242; 348/333.12; 382/167

(58) Field of Classification Search ............. 348/208.12, 348/222.1, 223.1, 224.1, 225.1, 242, 333.12; 382/167

See application file for complete search history.

(56) References Cited

U.S. PATENT DOCUMENTS

| | | | | |
|---|---|---|---|---|
| 6,642,957 B1 * | 11/2003 | Taura | ......................... | 348/223.1 |
| 6,670,987 B1 * | 12/2003 | Taura | ......................... | 348/223.1 |
| 7,636,108 B2 * | 12/2009 | Suzuki et al. | ............... | 348/223.1 |
| 7,643,068 B2 * | 1/2010 | Hyodo | ......................... | 348/223.1 |
| 7,969,479 B2 * | 6/2011 | Noh et al. | ................... | 348/223.1 |

FOREIGN PATENT DOCUMENTS

JP    2004-320671    11/2004

* cited by examiner

*Primary Examiner* — Daniel M Pasiewicz
(74) *Attorney, Agent, or Firm* — Rader Fishman & Grauer, PLLC

(57) ABSTRACT

An image processing device includes a white balancing unit configured to perform white balancing on an image signal within a pull-in frame defined by the color temperature of a light source to output the resultant signal, and a control unit configured to, when the white balancing unit performs white balancing on an image signal obtained by capturing an image of a subject illuminated by light emitted from a light emitting device, adjust a region of the pull-in frame on the basis of color information of a light emission signal output from the light emitting device.

12 Claims, 9 Drawing Sheets

DEVICE AND METHOD FOR IMAGE PROCESSING, PROGRAM, AND IMAGING APPARATUS

BACKGROUND OF THE INVENTION

1. Field of the Invention

The present invention relates to an image processing device and method for performing white balancing on an image, a program therefor, and an imaging apparatus.

2. Description of the Related Art

White balance (or white balancing) is a process of adjusting tints of an image captured by an imaging apparatus to adjust the color balance of the image depending on a change of a light source. Related-art white balances are broadly classified into two kinds of methods, namely, a first method of imaging a white subject before shooting and performing adjustment and a second method of imaging an actual subject during shooting and performing adjustment.

According to the first method, the adjustment is performed so that the balance of color components (R, G, and B) is 1:1:1 for processing for adjustment.

According to the second method, the presence or absence of the influence of a light source is determined on the basis of results of integration for the respective color components in an area obtained from an imaging signal during shooting. When the presence of the influence of the light source is determined, gain adjustment is properly performed so as to match an estimated hue of the color source. When the absence of the influence of the light source is determined, it is determined that a subject itself has a color. Gain adjustment is not performed and the color of the subject is kept.

According to white balancing disclosed in Japanese Unexamined Patent Application Publication No. 2004-320671, in order to adjust a color to its original color with reference to the influence of a light source, a determination is made using a "pull-in frame" defined by the color temperature of the light source as to whether to keep the original color of a subject which is not affected by the light source. A color component affected by the light source is removed. According to such a technique disclosed in Japanese Unexamined Patent Application Publication No. 2004-320671, a pull-in frame is set on the basis of the color temperatures of daylight and fluorescent light assumed as general light sources, the color components of a light source are calculated based on the proportion of the color components within a blackbody radiation curve, and when the color components exist in the pull-in frame, a video image is adjusted so that the color components becomes closer to the blackbody radiation curve.

SUMMARY OF THE INVENTION

According to the above related-art white balancing, however, assuming that a white subject is positioned under a special light source, in some cases, the light source illuminating the subject is not determined as a general light source and a color reflected by the subject is determined as the color of the subject. It is therefore difficult to perform proper white balance.

For example, in visual communication systems, e.g., videophones, an imaging apparatus is often installed near a video display device. In such a visual communication system, therefore, a subject is inevitably shot at a short distance from the video display device, so that an image of the subject is captured while being highly susceptible to the influence of a light source, i.e., the video display device. Accordingly, in this system, an image of the subject is captured by the imaging apparatus while the subject is illuminated by light output from the display device. Furthermore, when the subject is shot under low-light environment, the percentage of light from the video display device is high. Accordingly, the influence of the light from the video display device on the subject is increased. Disadvantageously, a visually more uncomfortable video image is obtained.

Light output from a light emitting device, such as a video display device, is different from daylight and fluorescent light. Accordingly, even if an image of a subject has to be subjected to white balancing, white balancing is not performed because color components are outside a pull-in frame.

The present invention has been made in consideration of the above-described circumstances. It is desirable to provide an image processing device and method capable of performing proper white balance on a captured image obtained by shooting a subject illuminated by light output from a light emitting device to output a comfortable video image, and a program therefor. It is further desirable to provide an imaging apparatus including the image processing device.

According to an embodiment of the present invention, an image processing device includes a white balancing unit configured to perform white balancing on an image signal within a pull-in frame defined by the color temperature of a light source to output the resultant signal, and a control unit configured to, when the white balancing unit performs white balancing on an image signal obtained by capturing an image of a subject illuminated by light emitted from a light emitting device, adjust a region of the pull-in frame on the basis of color information of a light emission signal output from the light emitting device.

According to another embodiment of the present invention, there is provided a method for image processing, including the steps of, when white balancing is performed on an image signal obtained by capturing an image of a subject illuminated by light emitted from a light emitting device, adjusting a region of a pull-in frame defined by the color temperature of a light source on the basis of color information of a light emission signal output from the light emitting device, and performing white balancing on the image signal within the adjusted pull-in frame to output the resultant image signal.

According to another embodiment of the present invention, there is provided a program that allows a computer to perform image processing including the steps of, when white balancing is performed on an image signal obtained by capturing an image of a subject illuminated by light emitted from a light emitting device, adjusting a region of a pull-in frame defined by the color temperature of a light source on the basis of color information of a light emission signal output from the light emitting device, and performing white balancing on the image signal within the adjusted pull-in frame to output the resultant image signal.

According to another embodiment of the present invention, an imaging apparatus includes an imaging unit configured to capture an image of a subject, a white balancing unit configured to perform white balancing on an image signal corresponding to the image captured by the imaging unit within a pull-in frame defined by the color temperature of a light source to output the resultant signal, and a control unit configured to, when the white balancing unit performs white balancing on an image signal obtained by capturing an image of the subject illuminated by light emitted from a light emitting device, adjust a region of the pull-in frame on the basis of color information of a light emission signal output from the light emitting device.

According to any of the above embodiments of the present invention, white balancing is performed in consideration of color information of a light emission signal output from a light emitting device. Advantageously, proper white balance is performed on a captured image obtained by shooting a subject illuminated by light from the light emitting device, thus outputting a visually comfortable video image.

DESCRIPTION OF THE PREFERRED EMBODIMENTS

Preferred embodiments of the present invention will be described in detail below with reference to the drawings.

Figure 1:
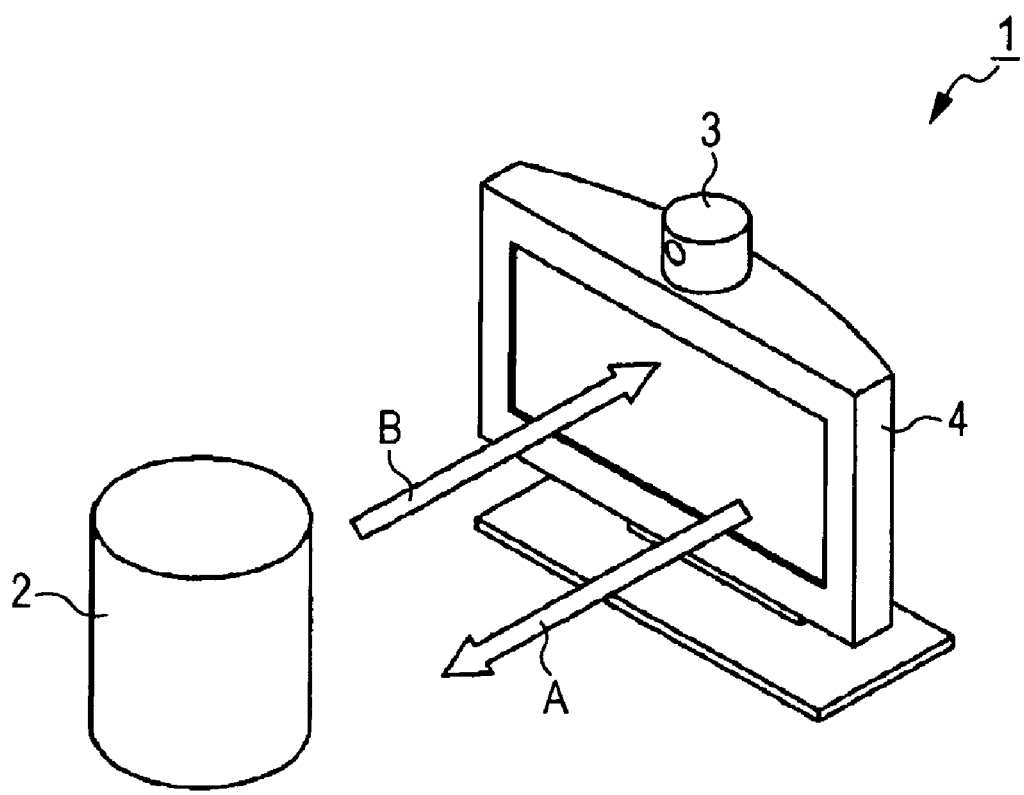
FIG. 1 is a diagram illustrating the entire configuration of a visual communication system.

An image processing device according to an embodiment of the present invention performs white balancing on an image. The image processing device is incorporated into an imaging apparatus 3 used in a visual communication system 1, such as a videophone, as shown in FIG. 1.

The visual communication system 1 is a system for transmitting a captured image, obtained by shooting a subject 2, e.g., a person's face, through the imaging apparatus 3, to a remote place and receiving a video image from the remote place and allowing a video display device 4 to display the received video image such that the image is visually recognized. In the visual communication system 1, the imaging apparatus 3 and the video display device 4 are disposed very close to each other. In the visual communication system 1, the imaging apparatus 3 may be integrated with the video display device 4.

In the visual communication system 1, since the distance between the subject 2 and the video display device 4 is short, light output from the video display device 4 is reflected to the imaging apparatus 3. Specifically, in the visual communication system 1, light from the video display device 4 impinges on the subject 2 as shown by the arrow A in FIG. 1. The imaging apparatus 3 captures an image of the subject 2 while being illuminated by reflected light of the light from the video display device 4 as shown by the arrow B in FIG. 1. The image captured under such a condition results in a visually uncomfortable video image. Similarly, a captured image, obtained by shooting a subject illuminated by light that is emitted from a light emitting device other than the video display device 4 and has color components different from those of daylight and fluorescent light, also results in a visually uncomfortable video image.

The imaging apparatus 3 therefore has the following configuration in order to perform appropriate white balance on a captured image obtained by shooting the subject 2 illuminated by light which is emitted from a light emitting device, e.g., the video display device 4, and whose color components vary over time.

Figure 2:
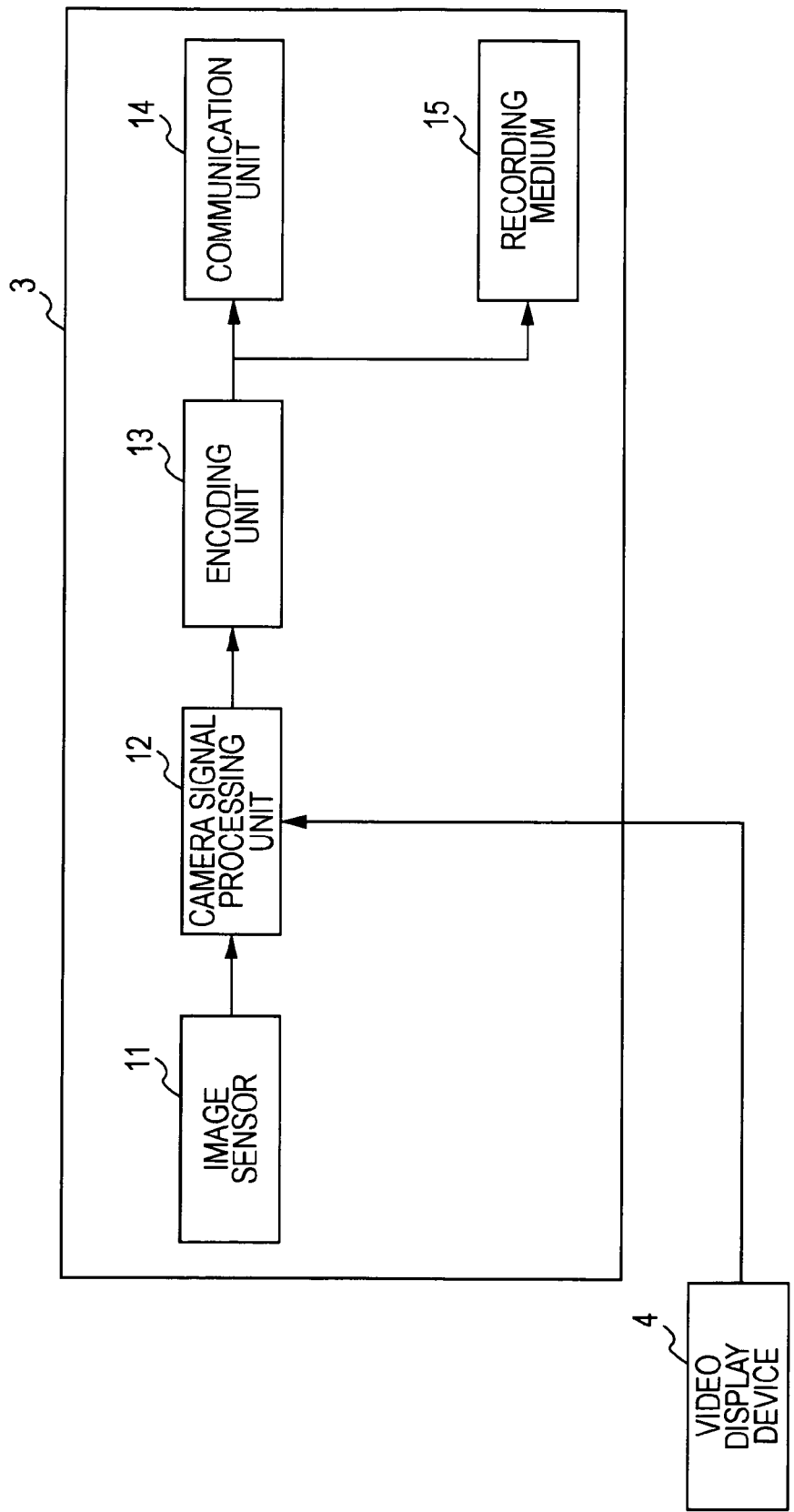
FIG. 2 is a block diagram illustrating the entire configuration of an imaging apparatus according to an embodiment of the present invention.

Referring to FIG. 2, the imaging apparatus 3 includes an image sensor 11 that captures an image of the subject 2 and a camera signal processing unit 12 that performs signal processing on an imaging signal obtained through the image sensor 11. In addition, the imaging apparatus 3 includes an encoding unit 13 that compresses and encodes an image signal, a communication unit 14 that transmits the compressed and encoded image signal to a remote place over a telecommunication circuit, and a recording medium 15 that records the compressed and encoded image signal.

The image sensor 11 converts light reflected from the subject 2, illuminated by light from the video display device 4, into an electrical signal, converts the electrical signal in analog form into an imaging signal in digital form, and supplies the imaging signal to the camera signal processing unit 12.

The camera signal processing unit 12 performs camera signal processing, such as edge enhancement, gamma correction, and color difference matrix transformation, including at least white balancing on the imaging signal supplied from the image sensor 11 to generate an image signal and supplies the image signal to the encoding unit 13.

The encoding unit 13 compresses the image signal, subjected to appropriate white balancing so as to be visually comfortable by the camera signal processing unit 12, using a motion predictive coding method, such as MPEG2, and supplies the encoded data to each of the communication unit 14 and the recording medium 15.

The communication unit 14 converts the encoded data supplied from the encoding unit 13 into transmission data conforming to the communication circuit and transmits the converted data.

The recording medium 15 records the encoded data supplied from the encoding unit 13.

In the imaging apparatus 3 with the above-described configuration, attention is paid to the camera signal processing unit 12. The configuration and operation of the camera signal processing unit 12 will be described below.

Figure 3:
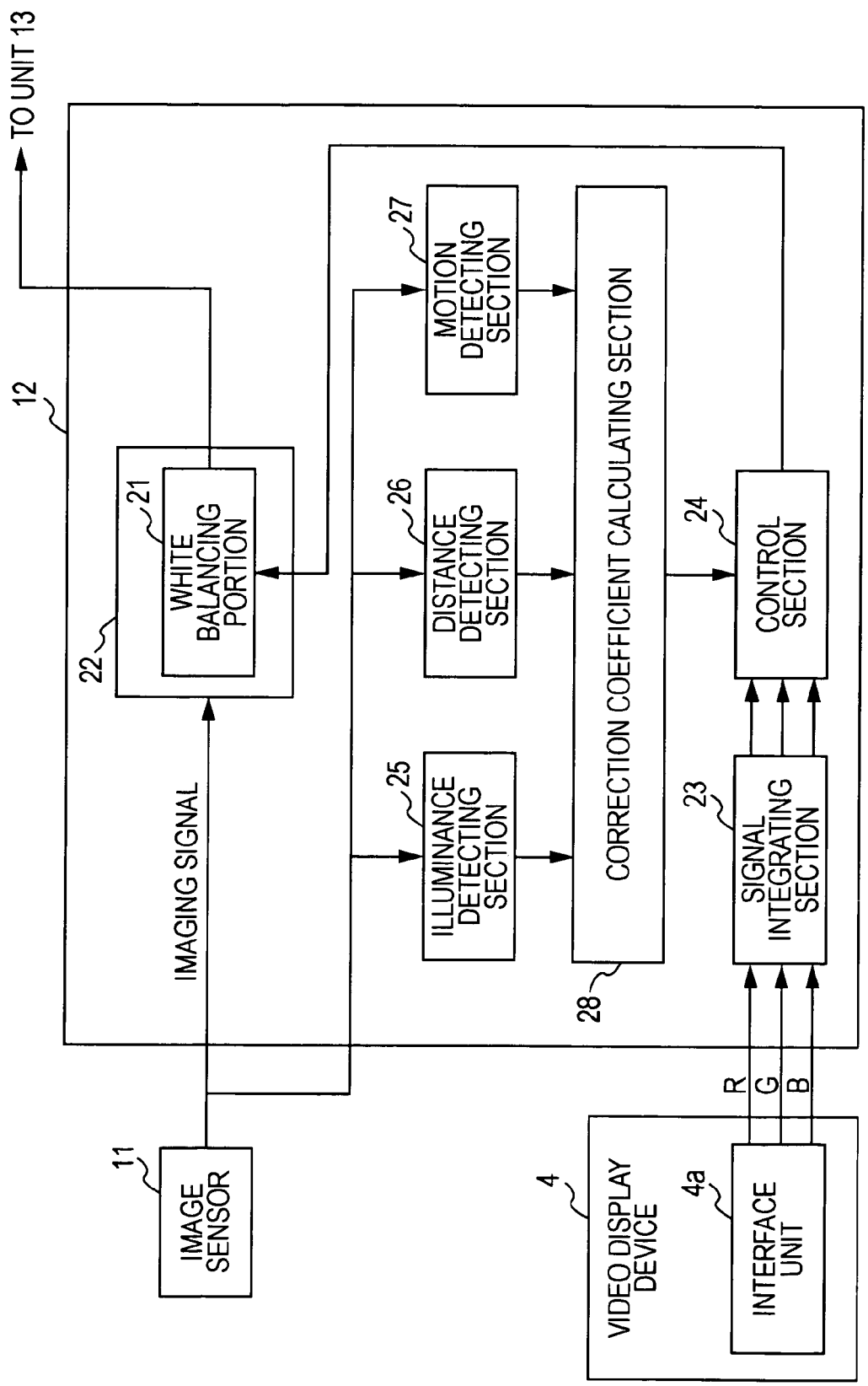
FIG. 3 is a block diagram illustrating the entire configuration of a camera signal processing unit.

The camera signal processing unit 12 has the following functions realized by installing a program into a general-purpose processor including a central processing unit (CPU), a random access memory (RAM), and a read only memory (ROM). Specifically, as shown in FIG. 3, the camera signal processing unit 12 includes a signal processing section 22 that includes a white balancing portion 21 and performs edge enhancement, gamma correction, and color difference matrix transformation. In order to control processing characteristics of the white balancing portion 21, the camera signal processing unit 12 further includes the following components. A signal integrating section 23 obtains integration information indicating integrations for color components of a video display signal output from the video display device 4. A control section 24 controls operating characteristics of the white balancing portion 21 in accordance with the integrations by the signal integrating section 23. The camera signal processing unit 12 further includes an illuminance detecting section 25, a distance detecting section 26, and a motion detecting section 27. The illuminance detecting section 25 detects an illuminance of a subject from a captured image. The distance detecting section 26 detects a distance to the subject including predetermined color information from a captured image. The motion detecting section 27 detects a motion of the subject from a captured image. In addition, the camera signal processing unit 12 includes a correction coefficient calculating section 28 that calculates a correction coefficient for controlling a correction intensity of white balancing on the basis of results of detection by the illuminance detecting section 25, the distance detecting section 26, and the motion detecting section 27.

Figure 4A:
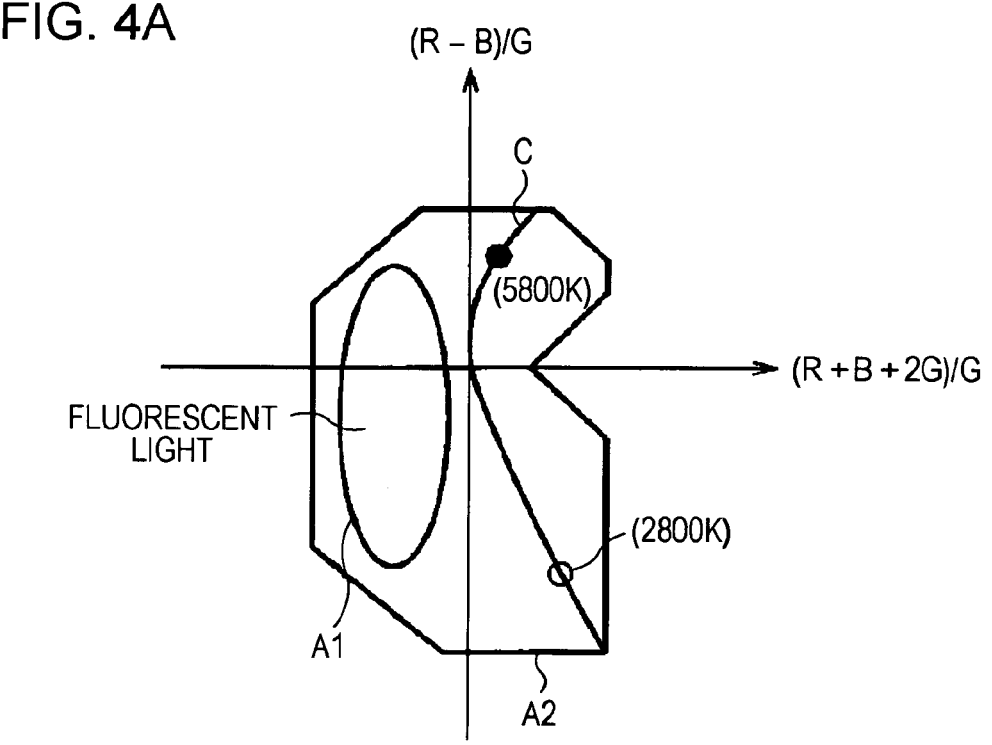
FIGS. 4A and 4B are diagrams explaining a "pull-in frame" defined in a color-temperature space.

The white balancing portion 21 is a processing portion that performs white balancing in the signal processing section 22 supplied with an imaging signal from the image sensor 11. The white balancing portion 21 performs white balancing on an image signal within a pull-in frame defined by the color temperature of a light source and outputs the resultant image signal. In this instance, white balancing is a process of matching a white image colored by a light source with neutral white defined by a blackbody radiation curve indicating the variation characteristic of the neutral color depending on the color temperature. As for the pull-in frame, for example, as shown in FIG. 4A, the pull-in frame corresponds to a region A2 including the blackbody radiation curve, indicated at C, based on a region A1 for the color components of fluorescent light in a color-temperature space defined by two-dimensional orthogonal coordinates in which the axis of abscissa is expressed by (R+B+2G)/G and the axis of ordinates is expressed by (R−G)/G.

Figure 4B:
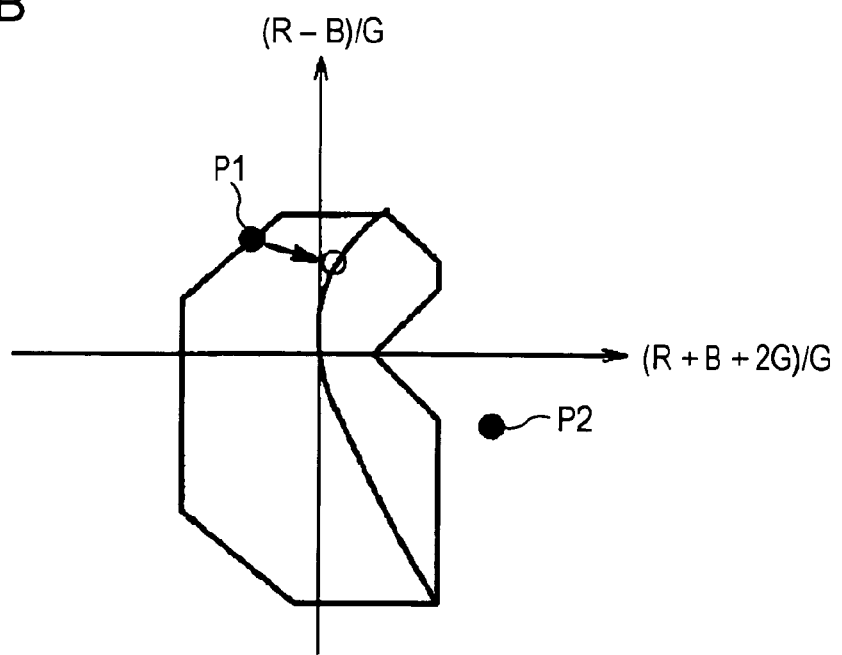

Specifically, the white balancing portion 21 determines whether an observed value P1, corresponding to integrated values of color signal components R, G, and B of an image signal per unit image, in the color-temperature space is located within the "pull-in frame". On the basis of a result of determination, when the observed value P1 is located within the pull-in frame A2, as shown in FIG. 4B, the white balancing portion 21 performs a process of multiplying each of the color signal components by a white balance gain so that a target value is shifted from the observed value P1 to a convergent point on the blackbody radiation curve C. The white balance gain indicates a correction intensity of white balancing. The value of correction intensity is controlled by the control section 24. Whereas, when an observed point P2, corresponding to integrated values of the color signal components R, G, and B of the image signal per unit image, in the color-temperature space is located outside the pull-in frame A2, the white balancing portion 21 does not perform white balancing. As described above, an image signal obtained under fluorescent light can be properly subjected to white balance using the pull-in frame A2.

The signal integrating section 23 receives a video display signal output from an interface unit 4a of the video display device 4 and obtains integration information related to the color components per unit image of the video display signal. Specifically, the signal integrating section 23 integrates pixel values of respective color signal components R, G, and B per unit image of the video display signal to obtain integration information. The signal integrating section 23 supplies the integration information to the control section 24. In particular, it is desirable that a video display signal to be displayed on the video display device 4 be supplied from the interface unit 4a to the camera signal processing unit 12 and integration information related to the color components per unit image of the video display signal be obtained. The reason is that it is desirable in terms of performing proper white balancing in consideration of the influence of light, varying at every moment, from the video display device 4.

When the white balancing portion 21 performs white balancing on an image signal obtained by capturing an image of a subject illuminated by light from the video display device 4, the control section 24 adjusts a region corresponding to the pull-in frame in accordance with color information of a video display signal displayed by the video display device 4.

Figure 5:
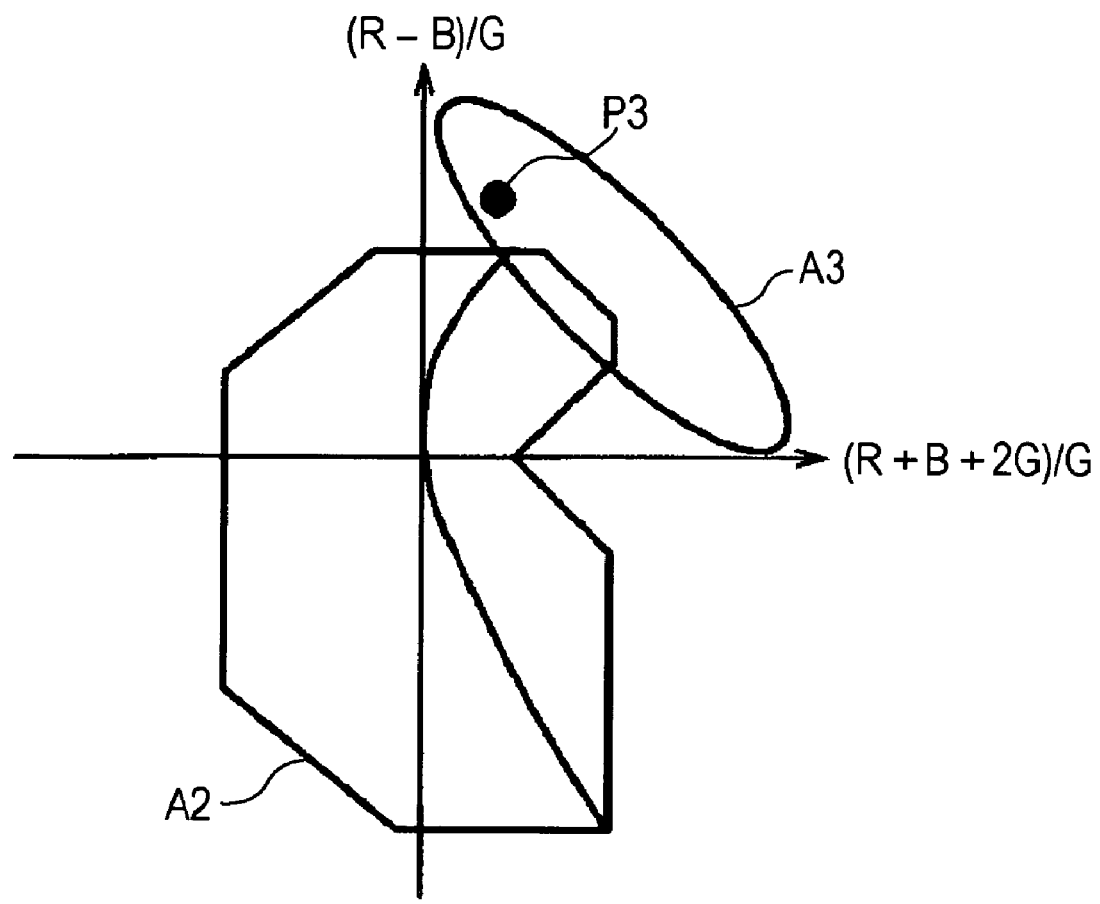
FIG. 5 is a diagram explaining the "pull-in frame" defined in the color-temperature space.

For example, referring to FIG. 5, a region A3 for the components of light output from the video display device 4 is deviated from the region corresponding to the pull-in frame A2 defined on the basis of fluorescent light. Accordingly, light from the video display device 4 is not regarded as light emitted from a light source. As for an image signal obtained by capturing an image of a subject illuminated by light from the video display device 4, therefore, an observed point P3, corresponding to integrated values of the color components of the image signal, in the color-temperature space is located outside the pull-in frame A2. Consequently, the image signal is output to the encoding unit 13 without being subjected to white balancing. In other words, the image signal corresponding to the captured image of the subject 2 with tints influenced by light from the video display device 4 is output the encoding unit 13.

Figure 6A:
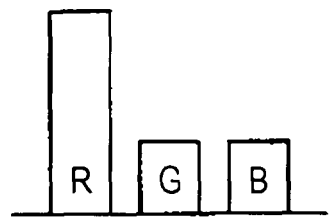
FIGS. 6A, 6B, and 6C are diagrams explaining a process of adjusting the "pull-in frame", the process being performed by a control section.
Figure 6B:
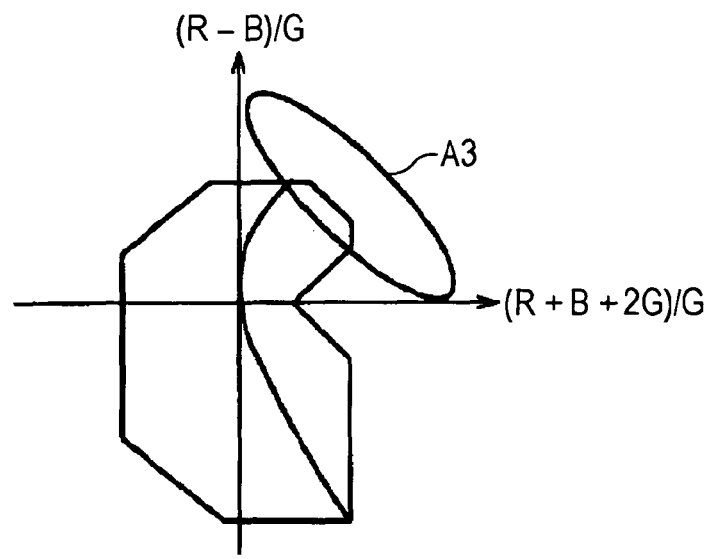
Figure 6C:
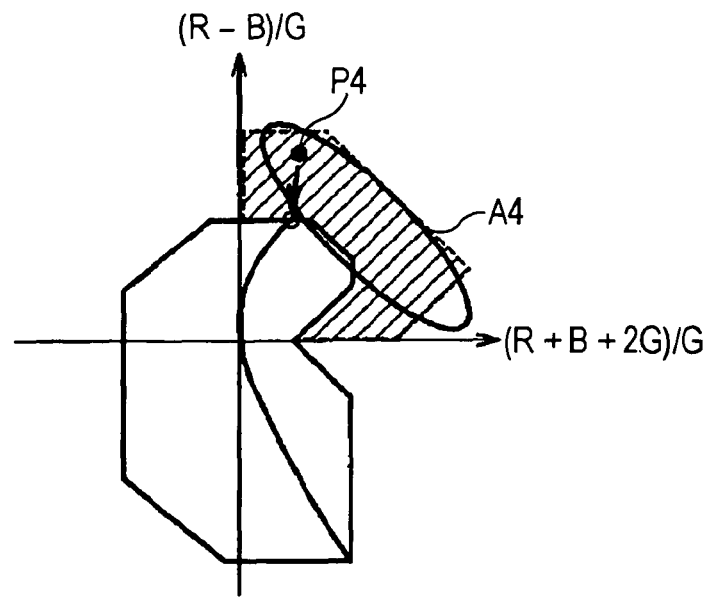

In order to perform white balancing based on color information of a video display signal, the control section 24 adjusts the pull-in frame as follows. First, the control section 24 determines whether an observed point corresponding to integrated values, as shown in FIG. 6A, supplied from the signal integrating section 23 is located in the region A3, shown in FIG. 6B, determined on the basis of the components of light output from the video display device 4. When an observed point P4, corresponding to the integrated values supplied from the signal integrating section 23, in the color-temperature space is outside the region A2 as the pull-in frame, the control section 24 extends the pull-in frame to a region A4 so that the pull-in frame includes the observed point P4.

In the camera signal processing unit 12, the control section 24 adjusts the region of the pull-in frame in accordance with color information of a video display signal in the above-described manner. Accordingly, proper white balance can be performed on a captured image obtained by shooting a subject illuminated by light from the video display device 4. The camera signal processing unit 12 can therefore output a properly white balanced video image that is visually comfortable.

In addition, the control section 24 adjusts a correction intensity of white balancing, i.e., a white balance gain in accordance with color information of a video display signal. Specifically, assuming that Int(R), Int(G), Int(B) denote integrated values of the color components of light from the video display device 4 and Int(min) denotes a minimum integrated value, the control section 24 divides the integrated values of the color components by the minimum integrated value Int (min), respectively, to normalize the integrated values. The control section 24 sets the normalized values as color integration coefficients and adjusts the white balance gains on the basis of the color integration coefficients.

As for light output from the video display device 4, the influence of the light source remarkably changes depending on a distance to a subject and the size of the subject. Accordingly, it is necessary to change white balance gains in accordance with those imaging circumstances. Specifically, when an imaging location is dark or the distance between a subject and the video display device 4 is short, the subject is illuminated by light output from the video display device 4, so that a captured image has uncomfortable tints. In the visual communication system 1, a person's face is often shot as a subject. In many cases, the subject is affected by light from the video display device 4. Especially, the uncomfortableness in skin color hue is conspicuous due to human's eye characteristics. It is therefore necessary to properly correct the skin color hue.

In the camera signal processing unit 12, the illuminance detecting section 25, the distance detecting section 26, and the motion detecting section 27 perform the following detecting processes in order to extract amounts of feature in the imaging circumstances.

The illuminance detecting section 25 calculates a brightness level per unit image from an imaging signal supplied from the image sensor 11 and detects an illuminance of a subject (hereinafter, also referred to as "subject illuminance") on the basis of the calculated brightness level. The illuminance detecting section 25 supplies illuminance data indicating the detected subject illuminance to the correction coefficient calculating section 28. When an automatic exposure function operates in the imaging apparatus 3, the illuminance detecting section 25 may detect the subject illuminance on the basis of a diaphragm stop of an optical system for forming an optical image on the image sensor 11.

The distance detecting section 26 detects a distance to a subject (hereinafter, also referred to as "subject distance") on the basis of an imaging signal supplied from the image sensor 11. In this instance, most of subjects in the visual communication system 1 are persons' faces. Since the proportion of a person's face in the angle of view is large, characteristically, the person's face is considerably affected by light output from the video display device 4. In addition, since the uncomfortableness in skin color hue is especially conspicuous due to human's eye characteristics, it is necessary to properly correct the skin color hue. On the basis of the above-described characteristics, therefore, the distance detecting section 26 detects skin color information defined in an RGB space from the imaging signal to calculate a face area in the angle of view. The distance detecting section 26 then detects a subject distance on the basis of the result of calculation. The distance detecting section 26 supplies data indicating the calculated face area and the subject distance to the correction coefficient calculating section 28. The distance detecting section 26 may detect a subject distance from an image signal subjected to camera signal processing by the signal processing section 22. The imaging apparatus 3 may detect a subject distance using near-infrared radiation and supply data indicating the detected subject distance to the correction coefficient calculating section 28.

The motion detecting section 27 detects a motion of a subject (hereinafter, also referred to as "subject motion") on the basis of an imaging signal supplied from the image sensor 11. Specifically, the motion detecting section 27 calculates an amount of movement of the subject between unit images on the basis of the imaging signal to detect the subject motion on the basis of the result of calculation. The motion detecting section 27 supplies data indicating the detected subject motion to the correction coefficient calculating section 28.

The correction coefficient calculating section 28 calculates a correction coefficient for each color component in accordance with the results of detection by the illuminance detecting section 25, the distance detecting section 26, and the motion detecting section 27. The correction coefficient calculating section 28 supplies data indicating the calculated correction coefficients to the control section 24. In this instance, the correction coefficients are control parameters for adjusting white balance gains in a manner similar to the above-described color integration coefficients.

Figure 7:
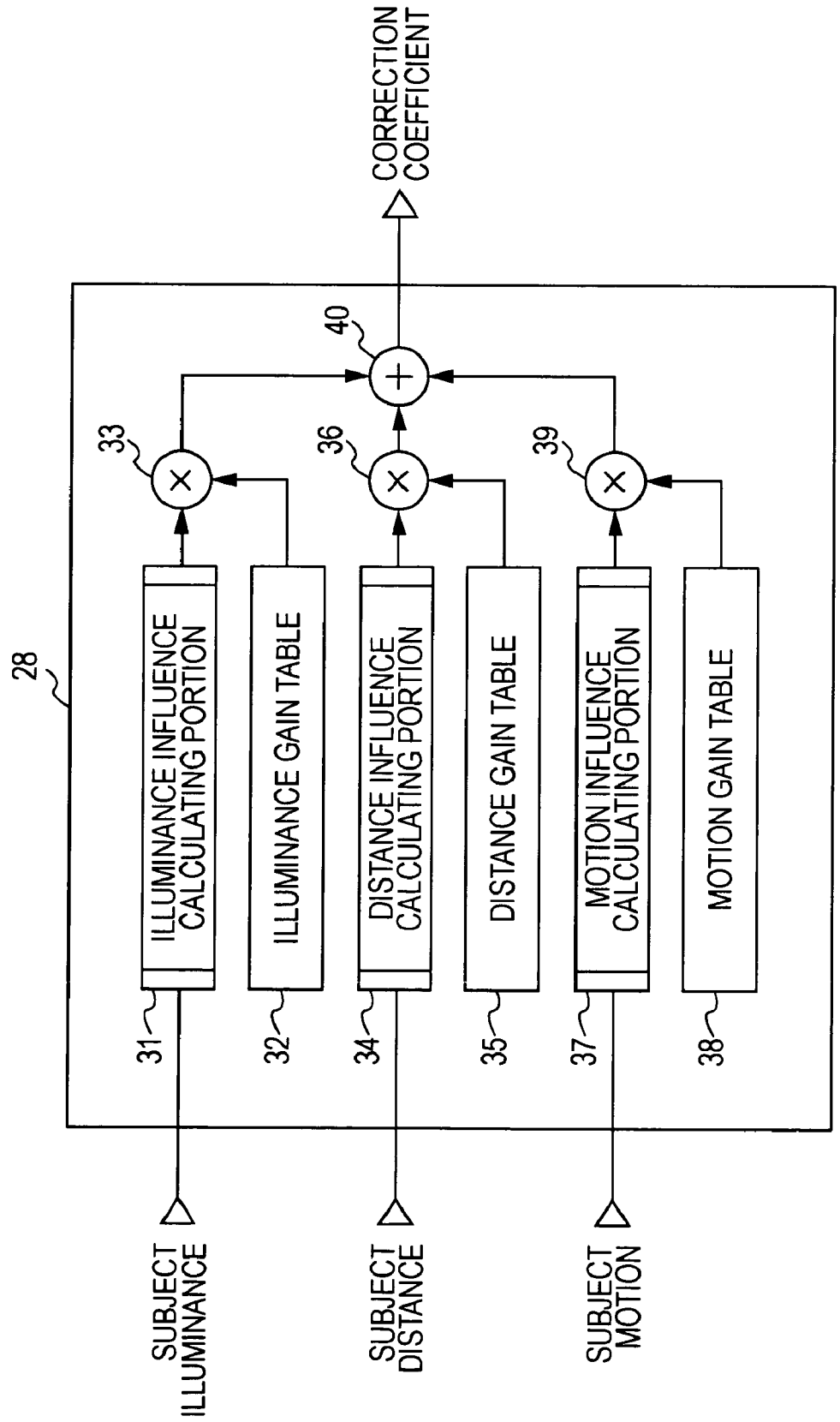
FIG. 7 is a block diagram illustrating a concrete configuration of a correction coefficient calculating section.

Referring to FIG. 7, the correction coefficient calculating section 28 includes an illuminance influence calculating portion 31, an illuminance gain table 32, and a multiplier 33 in order to calculate a correction coefficient based on the subject illuminance detected by the illuminance detecting section 25. The correction coefficient calculating section 28 further includes a distance influence calculating portion 34, a distance gain table 35, and a multiplier 36 in order to calculate a correction coefficient based on the subject distance detected by the distance detecting section 26. In addition, the correction coefficient calculating section 28 includes a motion influence calculating portion 37, a motion gain table 38, and a multiplier 39 in order to calculate a correction coefficient based on the subject motion detected by the motion detecting section 27. The correction coefficient calculating section 28 further includes an adder 40 for adding results of multiplication by the three multipliers 33, 36, and 39.

Figure 8A:
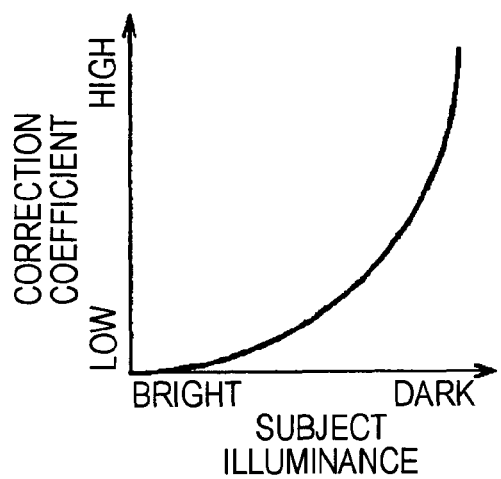
FIGS. 8A, 8B, and 8C are diagrams explaining processes performed by the correction coefficient calculating section.

First, the correction coefficient calculating section 28 adjusts a correction coefficient so that a correction intensity of white balancing increases as a subject illuminance detected by the illuminance detecting section 25 decreases, as shown in FIG. 8A. Specifically, the correction coefficient calculating section 28 allows the illuminance influence calculating portion 31 to calculate a correction coefficient based on the subject illuminance, refers to the illuminance gain table 32 having a gain characteristic shown in FIG. 8A, allows the multiplier 33 to perform gain processing on the correction coefficient, and outputs the resultant correction coefficient to the adder 40. When an illuminance under the imaging circumstances is low (dark), the degree of influence of light output from the video display device 4 is high. Accordingly, the correction coefficient calculating section 28 performs processing of increasing the correction intensity. Whereas, when an illuminance under the imaging circumstances is high, most of signals input to the image sensor 11 are obtained from a light source other than the video display device 4 and the degree of influence of light emitted from the video display device 4 is low. Accordingly, the correction coefficient calculating section 28 performs processing of reducing the correction intensity.

Figure 8B:
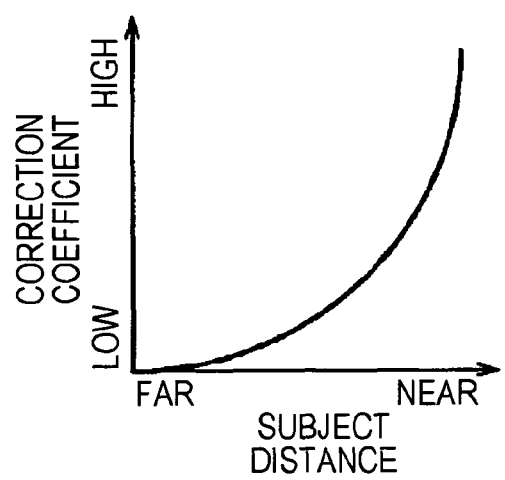

Second, the correction coefficient calculating section 28 adjusts a correction coefficient so that a correction intensity of white balancing increases as a subject distance detected by the distance detecting section 26 decreases, as shown in FIG. 8B. Specifically, the correction coefficient calculating section 28 allows the distance influence calculating portion 34 to calculate a correction coefficient based on the subject distance, refers to the distance gain table 35 having a gain characteristic shown in FIG. 8B, allows the multiplier 36 to perform gain processing on the correction coefficient, and outputs the resultant coefficient to the adder 40.

The correction coefficient calculating section 28 may confirm a change in brightness in a face area and that in color difference on the basis of data supplied from the distance detecting section 26 and adjust a correction coefficient on the basis of an amount of change in brightness and that in color difference. In this manner, the correction coefficient calculating section 28 can calculate a correction coefficient with accuracy so that the color of a person's face can be properly adjusted.

Figure 8C:
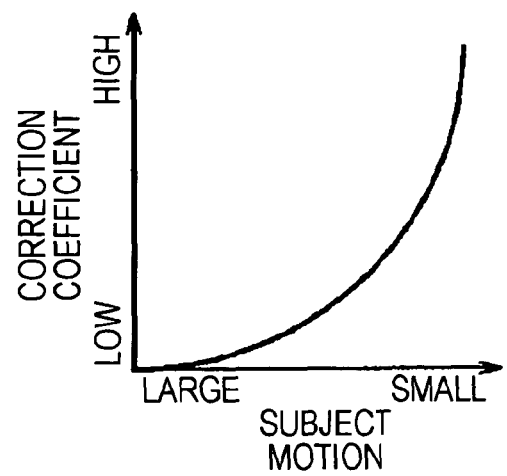

Third, the correction coefficient calculating section 28 adjusts a correction coefficient so that a correction intensity of white balancing increases as a subject motion detected by the motion detecting section 27 becomes smaller, as shown in FIG. 8C. Specifically, the correction coefficient calculating section 28 allows the motion influence calculating portion 37 to calculate a correction coefficient based on the subject motion, refers to the motion gain table 38 having a gain characteristic shown in FIG. 8C, allows the multiplier 39 to perform gain processing on the correction coefficient, and outputs the resultant correction coefficient to the adder 40.

The correction coefficient calculating section 28 allows the adder 40 to add results of multiplication by the above-described three multipliers 33, 36, and 39, thus obtaining a correction coefficient. The correction coefficient calculating section 28 supplies data indicating the obtained correction coefficient to the control section 24.

As described above, in the camera signal processing unit 12, the correction coefficient calculating section 28 can accurately calculate a correction coefficient in consideration of the imaging circumstances. Accordingly, the control section 24 multiplies a color integration coefficient, obtained from a video display signal, for each color component by the corresponding correction coefficient calculated by the correction coefficient calculating section 28, thus obtaining white balance gains for the color components. Specifically, the control section 24 can perform optimum white balancing on the basis of a video display signal and an imaging signal in consideration of imaging circumstances, thus outputting a visually comfortable image.

Figure 9:
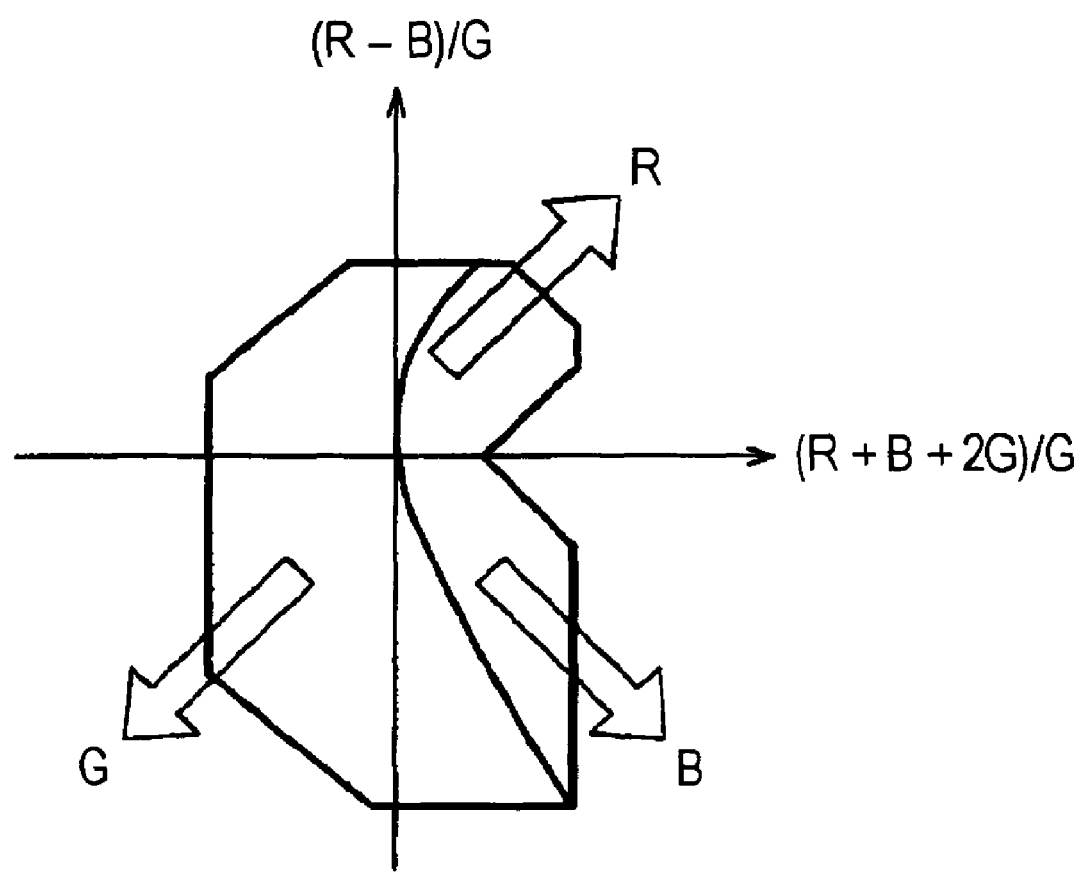
FIG. 9 is a diagram explaining segments of a pull-in determination frame in respective quadrants in the color-temperature space defined by two-dimensional coordinates.

In addition, the control section 24 uses the white balance gains for the respective color components, obtained by multiplying a color integration coefficient for each color component by the corresponding correction coefficient, as control parameters for adjusting the "pull-in frame". Specifically, segments of the pull-in frame in respective quadrants in the color-temperature space defined by two-dimensional coordinates substantially match the respective color components, as shown in FIG. 9. In other words, the segment of the "pull-in frame" in the second quadrant, that in the third quadrant, and that in the fourth quadrant substantially correspond to the components R, G, and B, respectively. The control section 24 therefore extends the pull-in frame in the quadrants corresponding to the respective color components on the basis of values proportional to the white balance gains for the respective color components. By performing such a process of extending the pull-in frame, the camera signal processing unit 12 can easily pull in elements considerably influenced by the color components of light output from the video display device 4. Thus, the camera signal processing unit 12 can perform white balancing while reducing the influence of light, e.g., light from the video display device 4, having learned components.

When processing is performed while light output from a video display device is merely regarded as a light source to be corrected by white balancing, white balancing has to be performed with respect to various color light components output from the video display device whose color information varies over time. Accordingly, the original effect of white balancing is not fully derived. According to the embodiment, the camera signal processing unit 12 can accurately perform white balancing on an image influenced by such a light source which it has been difficult to correct, since the camera signal processing unit 12 can receive a video display signal from the video display device 4 before display of the signal. In other words, the camera signal processing unit 12 controls correction characteristics of white balancing synchronously with a display image displayed on the video display device 4 on the basis of a video display signal, so that a comfortable image can be output with accuracy.

The camera signal processing unit 12 can properly perform white balancing on a captured image influenced by a light emitting device other than the video display device 4 on the basis of a light emission signal from the device whose output light components can be previously learned.

The present application contains subject matter related to that disclosed in Japanese Priority Patent Application JP 2008-223865 filed in the Japan Patent Office on Sep. 1, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a white balancing unit configured to perform white balancing on an image signal within a pull-in frame defined by the color temperature of a light source to output a resultant image signal; and
   a control unit configured to, when the white balancing unit performs white balancing on the image signal obtained by capturing an image of a subject illuminated by light emitted from a light emitting device, adjust a region of the pull-in frame on the basis of color information of a light emission signal output from the light emitting device,
   wherein the light emitting device is a video display device that displays a video image based on the light emission signal,
   the white balancing unit performs white balancing on the image signal by multiplying each color component of the image signal by a white balance coefficient and outputs the resultant image signal, and
   the control unit adjusts each white balance coefficient on the basis of integration information related to the corresponding color component per unit image of a video image based on the light emission signal.

2. The device according to claim 1, further comprising:
   an illuminance detecting unit configured to detect an illuminance of the subject from the image signal obtained by capturing an image of the subject illuminated by light from the video display device, wherein
   the control section adjusts each white balance coefficient so that a correction intensity of white balancing by the white balancing unit increases as the illuminance of the subject detected by the illuminance detecting unit decreases.

3. The device according to claim 1, further comprising:
   a distance detecting unit configured to detect a distance to the subject from the image signal obtained by capturing an image of the subject illuminated by light from the video display device, wherein
   the control unit adjusts each white balance coefficient so that a correction intensity of white balancing by the white balancing unit increases as the distance detected by the distance detecting unit decreases.

4. The device according to claim 1, further comprising:
   a motion detecting unit configured to detect a motion of the subject from the image signal obtained by capturing an image of the subject illuminated by light from the video display device, wherein
   the control unit adjusts each white balance coefficient so that a correction intensity of white balancing by the white balancing unit increases as the motion of the subject detected by the motion detecting unit becomes smaller.

5. An image processing method, the method comprising:
   performing white balancing on an image signal within a pull-in frame defined by the color temperature of a light source to output a resultant image signal;
   adjusting a region of the pull-in frame on the basis of color information of a light emission signal output from a light emitting device, when the white balancing on the image signal is performed, the image signal being obtained by capturing an image including a subject illuminated by light emitted from the light emitting device, wherein the light emitting device is a video display device that displays a video image based on the light emission signal;

performing white balancing on the image signal by multiplying each color component of the image signal by a white balance coefficient and outputting the resultant image signal; and adjusting each white balance coefficient on the basis of integration information related to the corresponding color component per unit image of a video image based on the light emission signal.

6. The method according to claim 5, further comprising:

detecting an illuminance of the subject from the image signal obtained by capturing an image of the subject illuminated by light from the video display device; and adjusting each white balance coefficient so that a correction intensity of white balancing increases as the illuminance of the subject decreases.

7. The method according to claim 5, further comprising:

detecting a distance to the subject from the image signal obtained by capturing an image of the subject illuminated by light from the video display device; and adjusting each white balance coefficient so that a correction intensity of white balancing increases as the detected distance to the subject decreases.

8. The method according to claim 5, further comprising:

detecting a motion of the subject from the image signal obtained by capturing an image of the subject illuminated by light from the video display device; and adjusting each white balance coefficient so that a correction intensity of white balancing increases as the motion of the subject becomes smaller.

9. A non-transitory computer readable medium storing program code for image processing, the program code being executable to perform operations comprising:

performing white balancing on an image signal within a pull-in frame defined by the color temperature of a light source to output a resultant image signal;

adjusting a region of the pull-in frame on the basis of color information of a light emission signal output from a light emitting device, when the white balancing on the image signal is performed, the image signal being obtained by capturing an image including a subject illuminated by light emitted from the light emitting device, wherein the light emitting device is a video display device that displays a video image based on the light emission signal;

performing white balancing on the image signal by multiplying each color component of the image signal by a white balance coefficient and outputting the resultant image signal; and adjusting each white balance coefficient on the basis of integration information related to the corresponding color component per unit image of a video image based on the light emission signal.

10. The computer readable medium according to claim 9, wherein the operations further comprise:

detecting an illuminance of the subject from the image signal obtained by capturing an image of the subject illuminated by light from the video display device; and adjusting each white balance coefficient so that a correction intensity of white balancing increases as the illuminance of the subject decreases.

11. The computer readable medium according to claim 9, wherein the operations further comprise:

detecting a distance to the subject from the image signal obtained by capturing an image of the subject illuminated by light from the video display device; and adjusting each white balance coefficient so that a correction intensity of white balancing increases as the detected distance to the subject decreases.

12. The computer readable medium according to claim 9, wherein the operations further comprise:

detecting a motion of the subject from the image signal obtained by capturing an image of the subject illuminated by light from the video display device; and adjusting each white balance coefficient so that a correction intensity of white balancing increases as the motion of the subject becomes smaller.

* * * * *